United States Patent
Buta

Patent Number: 4,625,605
Date of Patent: Dec. 2, 1986

[54] AUTOMATIC KNIFE ALIGNMENT FOR SHEAR

[75] Inventor: John Buta, Salem, Ohio

[73] Assignee: John R. Buta, Salem, Ohio

[21] Appl. No.: 447,296

[22] Filed: Dec. 6, 1982

[51] Int. Cl.$^3$ .............................................. B26D 7/26
[52] U.S. Cl. ......................................... 83/368; 83/640
[58] Field of Search .................... 83/368, 640, 72, 641

[56] References Cited

U.S. PATENT DOCUMENTS

| | | | |
|---|---|---|---|
| 3,282,141 | 11/1966 | Gautron | 83/640 X |
| 3,371,569 | 3/1968 | Pearson et al. | 83/640 X |
| 3,756,110 | 9/1973 | Von Arx | 83/640 X |
| 3,968,714 | 7/1976 | Kuchyt | 83/640 X |
| 4,507,997 | 4/1985 | Ikeda | 83/368 |

FOREIGN PATENT DOCUMENTS

| | | | |
|---|---|---|---|
| 2245840 | 12/1973 | Fed. Rep. of Germany | 83/368 |
| 2332898 | 1/1975 | Fed. Rep. of Germany | 83/640 |

*Primary Examiner*—Frank T. Yost
*Attorney, Agent, or Firm*—Pearne, Gordon, Sessions, McCoy, Granger & Tilberry

[57] ABSTRACT

A device is provided to automatically adjust the horizontal space between movable and fixed knives of a metal cutting shear. Bellcranks are mounted on opposite sides of the shear frame with first arms in contact with the outboard vertical sides of the movable knife holder and with second arms positioned beneath the opposite outboard ends of the shear hold down clamp. Followers on the hold down clamp make contact with the second arms as the hold down clamp is lowered into clamping engagement with the top surface of a metal strip or plate to be sheared. The followers shift the second arms downwardly causing the first arms to shift the movable knife horizontally toward the fixed knife. The respective lengths of the first and second arms are selected to cause the horizontal shift of the movable knife to be a predetermined fraction of the vertical movement of the second arms to provide the correct clearance between knives for the determined thickness of the strip about to be sheared.

7 Claims, 8 Drawing Figures

AUTOMATIC KNIFE ALIGNMENT FOR SHEAR

BACKGROUND OF THE INVENTION

This invention pertains to the art of shearing metal strip and plate and, in particular, to means for adjusting the knives of a shear so as to obtain the best edge quality between the sheared portions of the metal stock passing through the shear. Typically, metal shears are used with various metal finishing procedures such as slitting, cutting to length, leveling, annealing, grinding, pickling and coating, to name a few. A conventional exit crop shear could be of the guillotine variety, wherein the movable blade is raked at an angle to provide offset shearing action, whereby the strip is contacted at one edge and sheared progressively from side to side.

In an effort to cut costs, improve quality, and remain competitive, greater demands are being made on the accuracy of the products produced by the various metal processing lines. Thus, it can be appreciated that it is quite essential that metal be cut square if it is to be folded or otherwise formed in any manner whereby the folded edge must make contact with yet another straight edge or flat surface. The more accurate that the cut is, the finer is the quality of the finished product which must depend on utilizing the cut edges of the basic cut plate or strip.

Over a long period of years, a body of empirical data has been accumulated which is generally accepted in the metal cutting trade relative to the thickness of the strip, the hardness of the strip, and the desired horizontal spacing between the movable and stationary knives of a metal cutting shear. In order to determine the recommended clearance between knives, it is only necessary to know the hardness of the material and the thickness of the strip. Reference may then be made to an appropriate table which will indicate the proper clearance adjustment between knives. This table is compiled by multiplying the thickness of the strip to be cut by an empirically derived number referred to in the trade as the K-factor. For instance, a K-factor of 0.07 would be appropriate for a soft or mild steel. Thus, assuming that the thickness of the steel strip is 0.020 inches, then the proper clearance between knife blades would be 0.020 inches times the K-factor of 0.07, yielding a clearance of 0.0014 inches. A typical table of clearances would be as follows.

|  | Clearances | | |
| --- | --- | --- | --- |
| Thickness | Soft Steel K = .07 | Medium Steel K = .10 | Hard Steel K = .15 |
| .020 | .0014 | .0020 | .0030 |
| .050 | .0035 | .0050 | .0075 |
| .200 | .140 | .0200 | .0300 |
| .500 | .350 | .0500 | .0750 |
| 1.000 | .0700 | .1000 | .1500 |

Accordingly, when a shear operator knows the thickness and hardness of the metal which he is processing, by referring to a table, such as the one above, he can determine the correct clearance between the shear knives. He must then manually adjust the knife clearance in accordance with the selected table value. There are various means for accomplishing this adjustment, such as by the insertion of shims, the use of cranks and threaded screws, motor drive means, wedges and the like. In any event, in order to obtain the most efficient, highest quality cut of the work product, it is necessary that the knives be adjusted properly for each thickness and hardness of metal.

Unfortunately, it often times occurs that the work product may have different thicknesses throughout its entire length. Therefore, if the shear operator is not constantly measuring the strip as it passes through the shear he will not know that the clearance between the knives is improper for a particular portion of the strip. As is usually the case in metal working operations of this sort, the operator has more than one task to attend to and he may be busy doing other things at a time when he should be noting that the knives of the shear require adjustment. Thus, unless constant vigilance is maintained at the shear, the cuts will be made which are of inferior quality, thereby diminishing the added value of the end product. In addition to the quality of the product, a proper clearance also provides longer knife life and requires lower cutting force. The best of the prior art knife adjusting means, requires from five to ten seconds to make a shear knife blade adjustment. However, since stock accumulator looping pits or towers only permit one or two minutes of down time, the number of knife clearance adjustments which can be made by prior art means is limited without shutting down the line and incurring consequent production losses.

OBJECTIVES OF THE INVENTION

In view of the industrial demand for high quality cuts of metal strip and the difficulty of consistently maintaining standard high quality cuts on prior art shears, it is an object of the subject invention to eliminate the need for manual adjustment of knife clearance. It is a further object of the invention to eliminate the operator entirely as a factor in making knife blade adjustments on industrial shears. Further objects of the invention are to provide: an industrial shear for cutting strip and plate with better cut edge quality; longer knife life; lower cutting force; automatic adjustment of knives as a function of the work product thickness; substantially instantaneous knife clearance adjustment; and means for adjustment of the shear knife clearance without the necessity of bringing the processing line to a stop or of depending on an accumulator to keep the line operating while the shear knives are being adjusted.

THEORY OF THE INVENTION

It is the concept of the subject invention to provide mechanical means to automatically adjust the horizontal clearance between the knives of an industrial shear as a function of the thickness of the strip being sheared. This concept is placed in practice by utilizing the work hold down clamp for a novel purpose. In accordance with the inventive concept, the hold down clamp is used to measure the thickness of the strip and to relay this information through a multiplier mechanism which will adjust the movable knife of the shear a horizontal distance K times the thickness measured by the hold down means. More specifically, a bellcrank type mechanism having a horizontal arm and a vertical arm is mounted on each side of the frame of the shear and so positioned that probes or followers from the hold down clamp will make contact with each horizontal arm as the hold down clamp moves into clamping engagement with the strip. If the reference plane of measurement denotes the maximum capacity of the shear in strip thickness, then the follower extending from the hold down clamp will just make contact with the horizontal arm but will not shift it downwardly. Thus, no clearance adjustment would be made between the knives, assuming that the knives are set for maximum clearance at the outset. As the strip progressively becomes thinner the follower will be permitted to move downward proportionately and the horizontal arm will be shifted downward substantially equal to the decrease in thickness of the strip. The length of the vertical arm divided by the length of the horizontal arm is preselected to provide a horizontal movement which will provide a clearance equal to K times the thickness of the strip.

Figure 1:
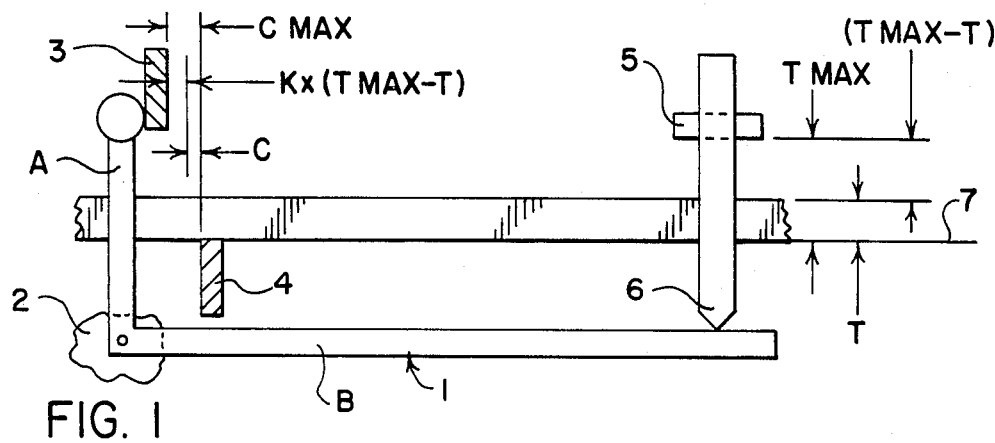
FIG. 1 is a schematic representation of the invention in maximum knife clearance position.
Figure 2:
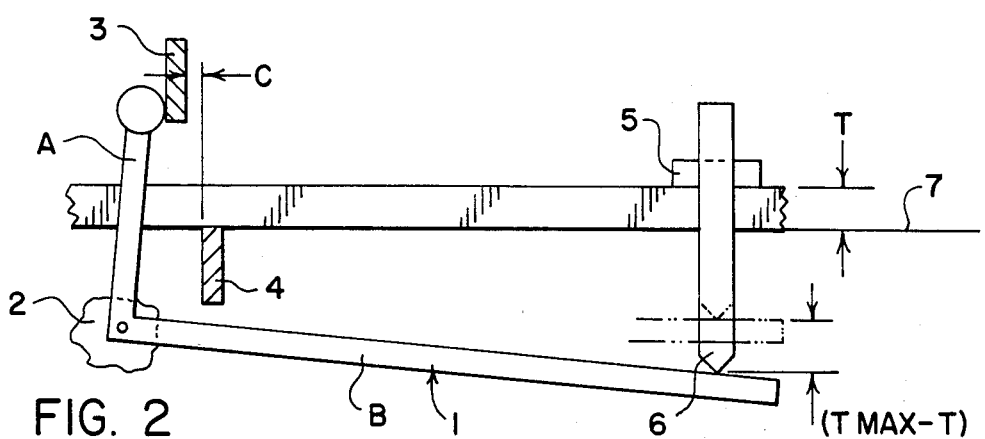
FIG. 2 is a schematic representation similar to FIG. 1 showing the invention in strip shearing position to provide proper knife adjustment.

By way of example, referring to FIGS. 1 and 2 of the drawings, it will be seen that a bellcrank 1 having arms A and B may be pivotally mounted on the frame 2 of the shear wherein the length of the vertical arm A divided by a predetermined length of the horizontal arm B equals K. The maximum horizontal clearance capacity of the shear between knives 3 and 4 is indicated as C Max. The desired clearance for a given thickness of strip is indicated as C; the maximum capacity of strip which can be sheared by this particular shear is indicated by T Max and the actual thickness of strip to be sheared is indicated by the letter T. Thus, it will be seen that when a hold down clamp 5 moves from the upper surface of T Max, FIG. 1, to the upper surface of T, FIG. 2, it will have moved a distance of (T Max−T) and shifted horizontal arm B substantially (T Max−T) downward by means of a follower 6. At the same time, the upper end of vertical arm A will have been shifted A/B times (T Max−T) of K×(T Max−T). Thus, the desired clearance can be represented by the formula $C = C \text{ Max} - K \times (T \text{ Max} - T)$.

Figure 3:
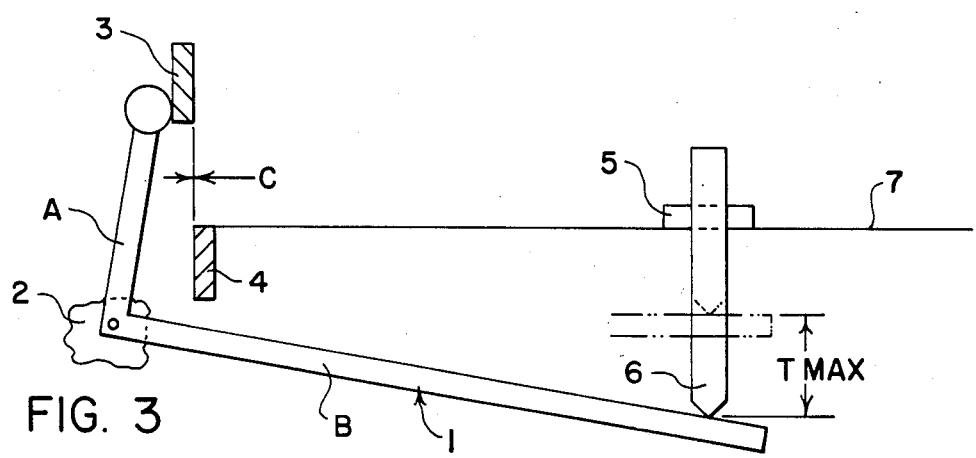
FIG. 3 is a schematic representation similar to FIGS. 1 and 2, showing the invention in zero knife clearance position.

By way of a second example, as illustrated in FIG. 3, if the reference plane, instead of being the horizontal plane of the top surface of T Max, is instead the lower surface of the metal being processed, i.e. the bed 7 of the shear, then the horizontal arm B will have been pre-shifted downwardly by follower 6 a distance of T Max at the outset. Thus, when a strip of T thickness is inserted on the shear bed, the follower 6 connected to hold down clamp 5 must be moved upward to clear the strip and to permit the horizontal arm B to arcuately shift upward a distance of T along with the hold down clamp 5. In so doing, the vertical arm will be shifted horizontally to the left a distance of K×T which equals the desired clearance C. Accordingly, it will be understood that, depending on the reference plane, if the reference is the upper surface of the maximum thickness of the strip then the proper clearance C is obtained by moving the hold down from T Max to T. If, however, the reference is the bed of the shear, C is obtained by moving the hold down upwardly from 0 strip thickness to T thickness, which shifts arm A a horizontal distance K×T, to provide the desired clearance C. However, whether the reference plane is T Max or T Zero, the ultimate horizontal adjustment of the shear knives will be the same, resulting in a clearance C.

DETAILED DISCUSSION OF THE DRAWINGS

Figure 4:
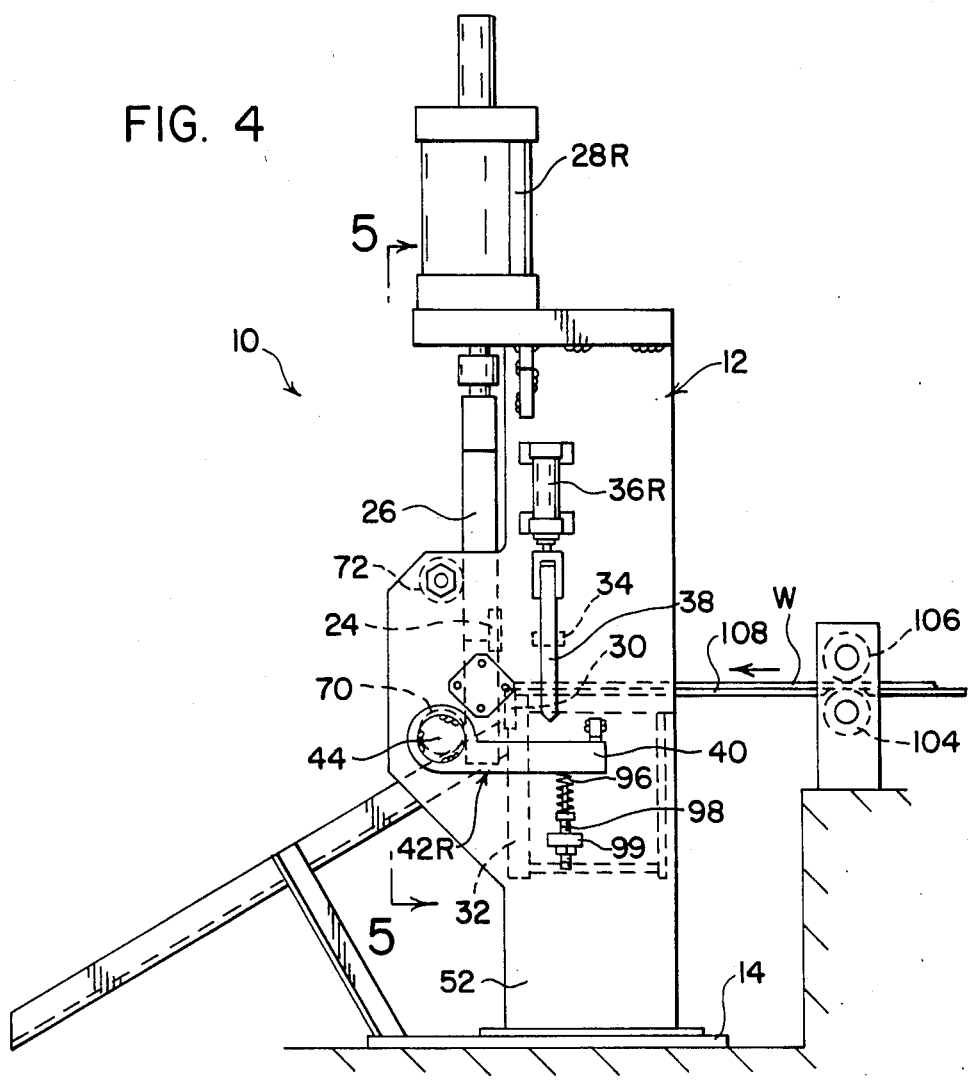
FIG. 4 is a side elevational view of a general arrangement of an exit crop shear incorporating the subject invention.
Figure 5:
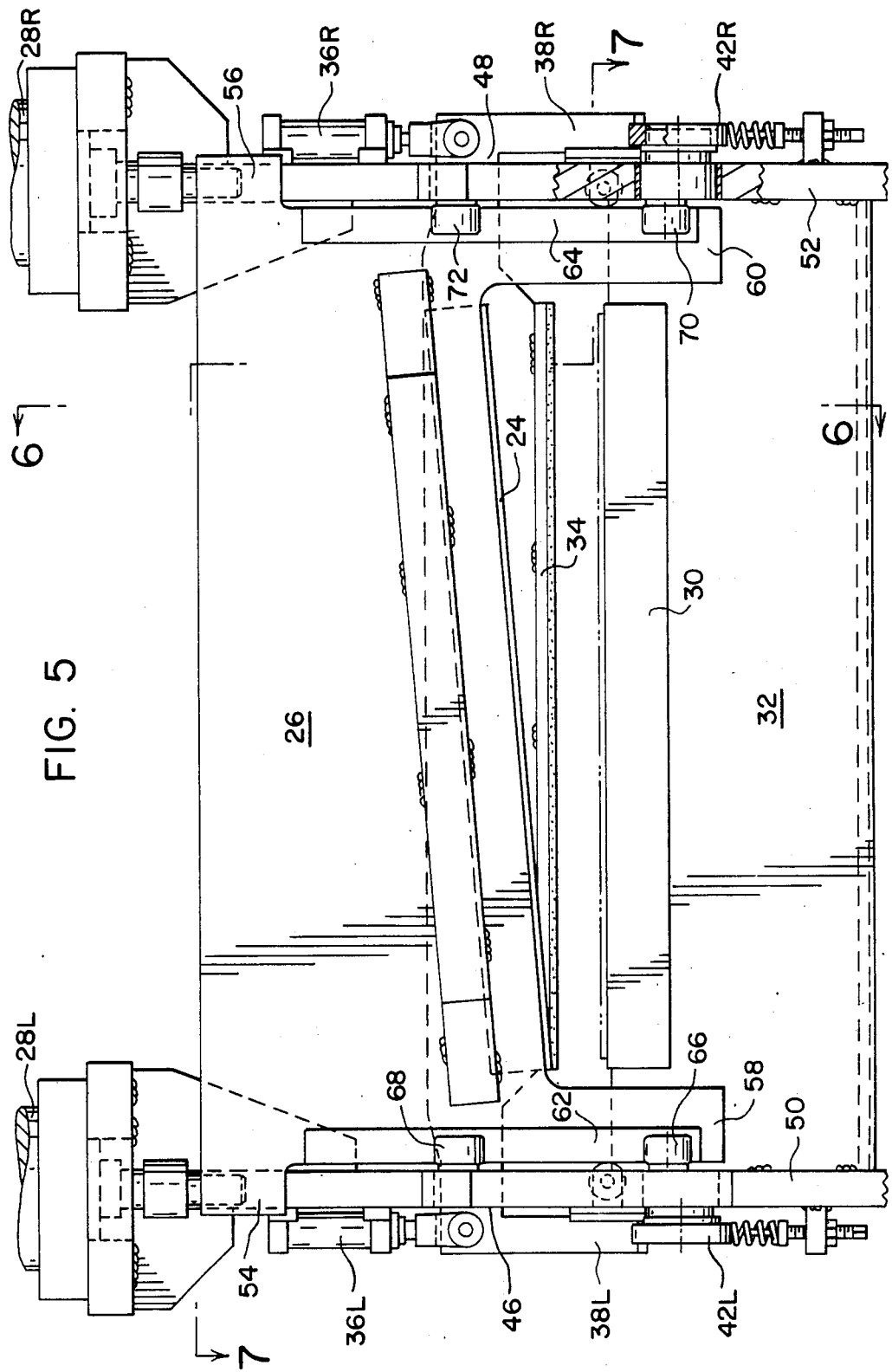
FIG. 5 is a partial front elevational view of the exit crop shear shown in FIG. 4.

Referring now to FIGS. 4 and 5, therein is shown a preferred embodiment of the invention in association with an exit crop shear 10. The shear comprises a frame 12 mounted on a base 14. The upper knife 24 is shown secured to upper knife holder 26 which is actuated by motor means 28L and 28R. Lower knife 30 is stationary and rigidly secured to lower knife holder 32 which is an integral part of the frame 12.

Also shown in FIGS. 4 and 5 is the work product hold down clamp 34 and hold down clamp actuators 36L and 36R. Followers 38L and 38R are mounted on each outboard end of hold down clamp 34 and extend downward to make contact with the horizontal arms 40 of bellcranks 42L and 42R, pivotally mounted at 44 on each side of frame 12.

Referring in particular to FIG. 5, this front elevational view shows a guillotine style upper knife 24. Also shown in this view is the lower stationary knife 30 and the hold down clamp 34. It will be observed that outboard ends 46 and 48 of hold down clamp 34 extend through windows of vertical side frame members 50 and 52 whereby they may be connected to motor drive means 36L and 36R on opposite sides of the frame. It will also be observed that upper knife holder 26 is provided with shoulders 54 and 56 which are connected to motor drive means 28L and 28R respectively. These motor drive means are adapted to drive the upper knife holder 26 vertically within the frame 12 of the exit crop shear 10. The upper knife holder 26 is also provided with a pair of depending guide portions 58 and 60 and gib plates 62 and 64 adapted to provide rolling surfaces for rollers 66 and 68 on gib plate 62 and rollers 70 and 72 on gib plate 64.

Figure 6:
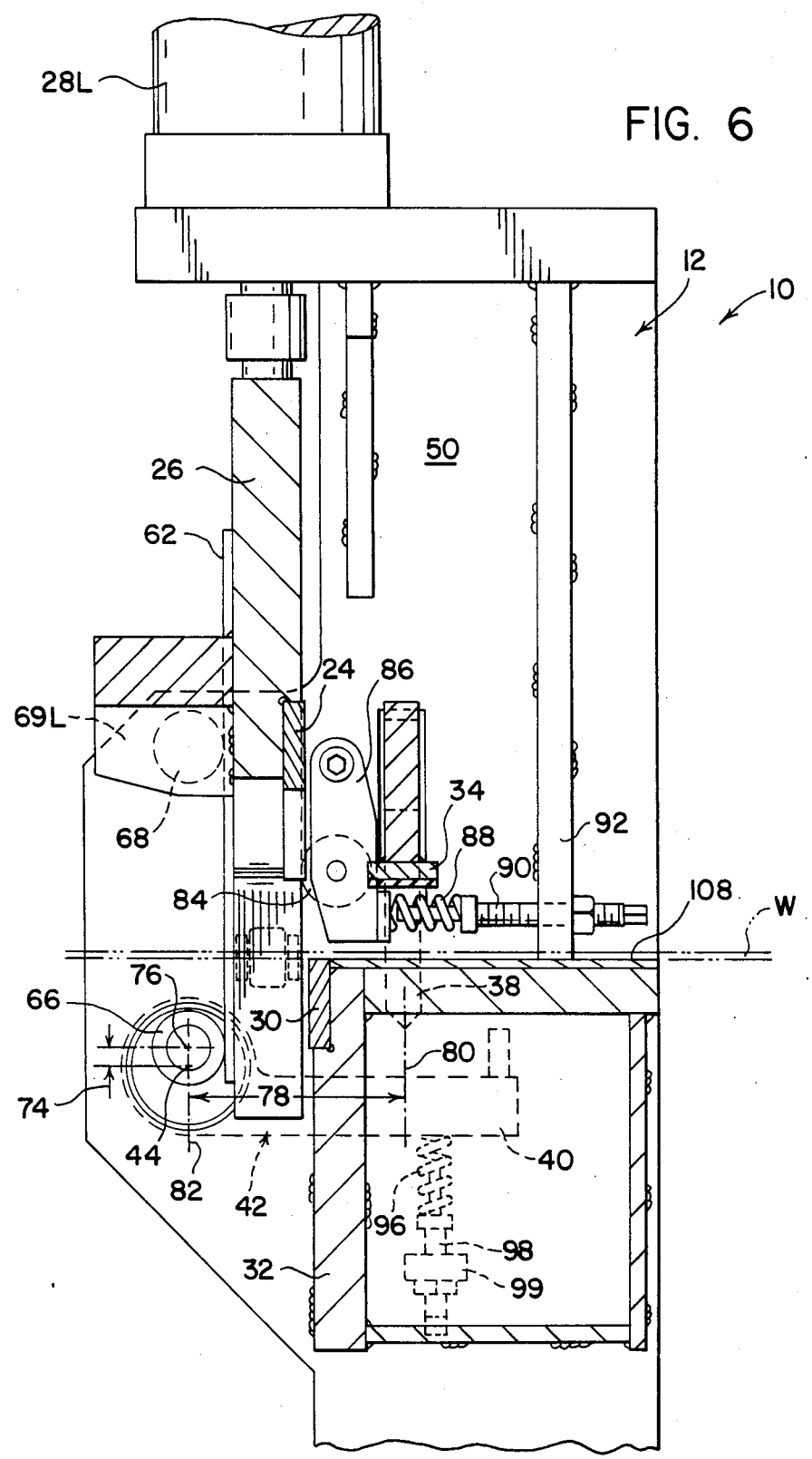
FIG. 6 is a sectional side elevational view of the exit crop shear of FIGS. 4 and 5 showing a preferred embodiment of the inventive automatic knife clearance adjusting means.

Referring to FIGS. 5 and 6, it will be seen that roller 66 is eccentrically mounted on the left side of the shear frame 12 on bellcrank 42 providing a throw 74, which is a distance measured between pivot point 44 and roll center 76. A similar structure is also mounted on the right side of the shear frame 12. Thus, in effect, the effective vertical portion of bell crank 42 is represented by throw 74. By correctly positioning probe 38 horizontally relative to arm 40 of bell crank 42, an effective horizontal arm length 78 is measured between the centerlines 80 of probe 38 and 82 of vertical arm 74. This arm length 78 provides the denominator of the ratio of the length 74 over the length 78 which, when properly selected, is the K value for the thickness of the strip being clamped by the hold down beam 34. As aforesaid, roller 70 is correspondingly mounted on the right side of the shear frame 12.

Figure 7:
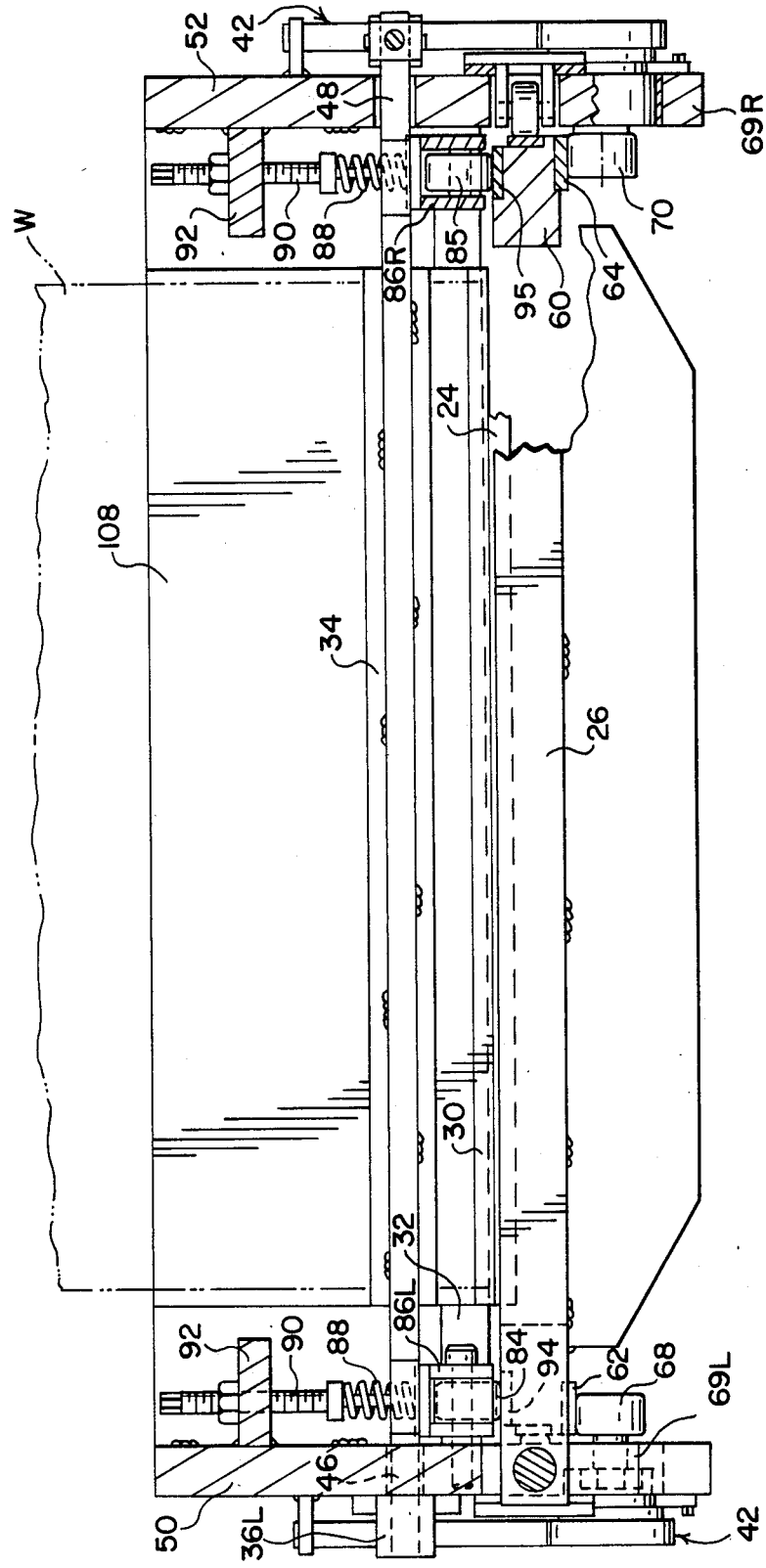
FIG. 7 is a plan view of an exit crop shear including the subject invention; and, FIG. 8 is a fragmentary elevational view of another preferred embodiment of the inventive automatic knife clearance adjusting means.

There are yet third rollers 84 and 85, see also FIG. 7, which are supported by brackets 86L and 86R. Brackets 86L and 86R are pivotally mounted to the frame 12 and spring urged against the upper knife holder 26 by spring means 88. Spring means 88 are secured on threaded fittings 90, mounted in frame structural members 92.

The plan view of the exit crop shear shown in FIG. 7 further illustrates the mounting of spring means 88 to bias rollers 84 and 85 against gib plates 94 and 95 of upper knife holding member 26.

From the foregoing, it will be understood that with roller 68, FIG. 6, rotatably secured to frame mounting plate 69L, roller 84 tends to pivot upper knife holder 26 about roller 68 into bearing contact with lower roller 66. Inasmuch as lower roller 66 is eccentrically mounted on bellcrank 42, any movement of horizontal arm 40 of bellcrank 42 will cause the roller 66 to move toward or away from the lower end 58 of upper knife holder 26. It will also be understood that when arm 40 of bellcrank 42 is moved downward, the eccentric throw 74 of roller 66 from bellcrank pivotal point 44 will move roller 66 to the right, as shown in FIG. 6. Movement of roller 66 to the right shifts upper knife holder 26 and knife 24 substantially horizontally to the right. Conversely, if arm 40 of bellcrank 42 is shifted upward, then roll 68 is moved away from upper knife holder 26 and spring biased roller 84 causes upper knife 24 to shift substantially horizontally to the left about roll 68 as an axis of rotation. It will also be observed from FIG. 6 that bellcrank arm 40 is biased upward by spring 96 secured to threaded fastener means 98 mounted on plate 99 of frame 12. By urging arm 40 upward with spring means 96, the combination of spring 88 and spring 96 removes all lost motion from the system, whereby upper knife 24 is resiliently held in position at all times. It will be understood that rollers 70, 72 and 85 are similarly mounted and actuated on the right side of the shear simultaneously with rollers 66, 68 and 84.

With the structure just described, it will also be understood that a combination of the three rollers 66, 68 and 84 mounted on the left side of the shear frame 12, and rollers 70, 72 and 85 mounted on the right side of the frame 12, combine to guide the upper knife holder 26 in its vertical path to and from the shearing plane of the exit crop shear 10. Roller 84, for example, biases knife holder 26 into rolling contact with rollers 66 and 68 and resiliently yields when roller 66 is eccentrically shifted against the left face of upper knife holder 26, as shown in FIG. 6, to pivot upper knife holder 26 about roller 68.

It will be further understood that the incremental pivoting of upper knife holder 26 about fixed rollers 68 and 72 is sufficient to provide the adjustment and clearance between upper knife 24 and lower knife 30, as predetermined by the K factor provided by bellcranks 42. Thus, when hold down clamp 34 makes clamping contact with the upper surface of a strip or plate to be sheared, follower 38 will depress arm 40 a distance equal to the maximum thickness of work which can be sheared less the thickness of the strip actually being sheared. Because the ratio of effective eccentric throw 74 over effective arm 40 equals K, the upper knife holder 26 will be shifted horizontally a distance K times the vertical downward movement of arm 40. This shift of upper knife holder 26 will be the correct adjustment to close the clearance from C Max to the required clearance C.

Figure 8:
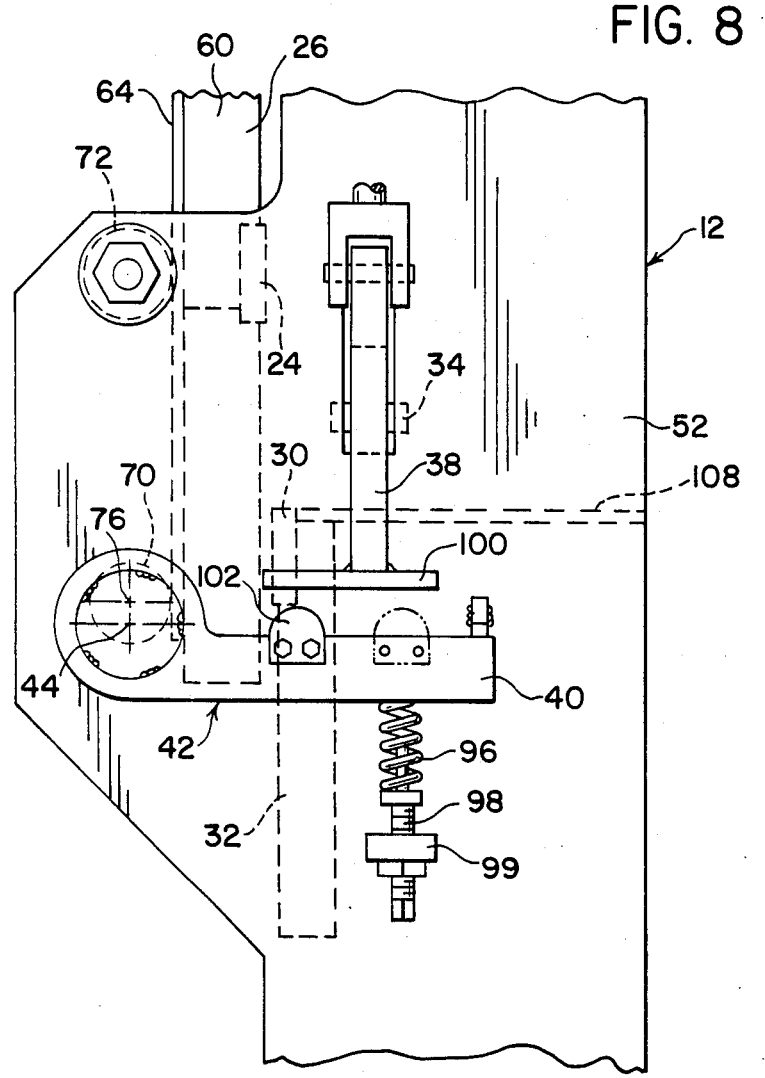

Obviously if follower 38 were immovable laterally, the shear knife clearance C would only be correct for one hardness and thickness of metal. Therefore, to render the equipment adjustable to accommodate all K factors encountered in shearing metal in a particular shear, a modification of the invention is shown in FIG. 8. Therein it will be noted that the lower end of the probe 38, instead of being provided with a knife edge as shown in FIG. 6, is provided with an elongated horizontal plate member 100. An adjustable pad 102 is mounted on the upper surface of arm 40 and is adapted to be shifted laterally on arm 40 within the confines of lower plate member 100. Thus, by shifting pad 102 either to the left or to the right, the ratio between eccentric throw 74 and arm 40 is modified, thereby changing the K factor. It is therefore possible to adjust the mechanism so that any K factor associated with a particular metal hardness and thickness can be incorporated in the relationship between eccentric 74 and arm 40.

OPERATION OF INVENTION

In operation, a work product strip or plate W is received by pinch rolls 104 and 106, FIG. 4, and fed onto the bed 108 of the exit crop shear 10. After the work product W has passed through the shear a predetermined distance, hold down clamp 34 will be lowered into clamping engagement with the work product W and upper knife 24 will be lowered to shear the strip. When the hold down clamp makes engagement with the upper surface of the work product W the probes 38 will arcuately shift arms 40 of bellcranks 42 downward and at the same time shift rollers 66 and 70 arcuately to the right against upper knife holder 26. Inasmuch as the shift of rollers 66 and 70 is K times the shift of arms 40, the clearance between upper and lower knives will also be diminished by the same amount as the shift of roller 66. The clearance C provided by this operation will accordingly equal K times the thickness of the strip being sheared.

After each shearing operation, springs 96, FIG. 6, will return arms 40 upwardly to horizontal positions so that prior to each shearing operation the gap between the upper and lower knives will be the maximum amount obtainable within a particular shear. However, this maximum clearance will be automatically adjusted to the correct K factor clearance required by the thickness of the strip each time that the hold down clamp makes engagement with the strip. It will be readily understood that irrespective of the length of a coil of strip being processed, and the variation in thickness of the strip throughout the coil, the hold down clamp will detect this variation for each length of strip to be sheared and the proper adjustment will automatically be made to the horizontal clearance C between the upper and lower knives 24 and 30 respectively. It will also be appreciated that this automatic adjustment of clearance between shearing knives is done without the requirement of any attention by the shear operator whatsoever. Before a work product having different physical properties is entered into the shear, the operator will, of course, first shift the pads 102 appropriate distances to the right or left to obtain the required K factor relationship between arms 40 and throws 74.

Having thus described the preferred embodiments of the invention, it will be clear to those skilled in the art that additional embodiments, modifications and improvements may be made without departing from the intended scope of the invention as defined in the appended claims.

I claim:

1. In a metal shear device having a pair of vertically opposed knives, means for automatically adjusting the horizontal clearance between said knives comprising: a bellcrank pivotally mounted on said shear device having a substantially horizontal arm and a substantially vertical arm, the ratio of the length of said vertical arm to the length of said horizontal arm being a predetermined constant, means to arcuately pivot said horizontal arm downward a vertical distance equal to the maximum thickness of metal shearable by said shear device minus the thickness of metal to be sheared and said vertical arm horizontally against one of said pair of vertically opposed knives a distance equal to the said vertical shift of said horizontal arm times said predetermined constant, whereby the clearance between said pair of knives is properly adjusted for the thickness of the metal to be sheared.

2. In a metal cutting shear device for cutting metal, said device having a pair of vertically opposed and horizontally spaced apart knives and holders for said knives, means for automatically adjusting the horizontal clearance between said knives comprising: means to shift one of said knives horizontally including first fixed roller means positioned to bear against the upper outside face of said knife holder, second roller means biased against the lower inside face of said knife holder, and third roller means horizontally shiftable to bear against the lower outside face of said knife holder, a bellcrank pivotally mounted on said shear device having vertical and horizontal arms, said vertical arm being adapted to rotatably carry said third roller means; the ratio of the length of said vertical arm to the length of said horizontal being a predetermined constant; sensing means adapted to be shiftable from a position indicating the maximum thickness of metal shearable by said shear means to a position indicating the minimum thickness of metal shearable by said shear means; follower means adapted to pivot said horizontal arm responsive to the shifting of said sensing means downward a vertical distance equal to the maximum thickness of metal shearable by said shear device minus the thickness of metal to be sheared, whereby said vertical arm is arcuately shifted a horizontal distance equal to the vertical shift of said horizontal arm multiplied by the ratio of the length of said vertical arm divided by the length of said horizontal arm; the shifting of said vertical arm being sufficient to overcome said biased second roller means whereby the cutting portion of said knife is horizontally shifted to provide the proper clearance for shearing metal having a shearing clearance constant equal to said predetermined constant.

3. The device of claim 2, wherein said follower is positioned to establish a ratio of movement between said horizontal arm and said vertical arm equal to said predetermined constant.

4. The device of claim 3, wherein said follower is provided with a laterally extended lower portion and a shiftable pad secured to said horizontal arm for engagement by said laterally extended lower portion, whereby the shifting of said pad changes the said ratio of said bellcrank arms.

5. In a metal shear having a frame and a pair of opposed vertically acting knives, means for automatically adjusting the horizontal clearance between upper and lower knives comprising: vertically shiftable metal hold down means; bellcrank means pivotally secured to said frame having a normally vertical crankarm and a normally horizontal crank arm; said vertical crankarm being positioned adjacent the outside face of said upper knife and in biased contact therewith; and follower means attached to said hold down means adapted to vertically shift with said hold down means and further adapted to contact and to pivot said horizontal crank arm during downward shifting of said follower, whereby said vertical crank arm is pivoted against said outside face of said upper knive to shift said blade horizontally toward said lower knife.

6. In a metal cropping shear having vertically shiftable metal hold down means, and a pair of opposed first and second knives, means for automatically adjusting the horizontal clearance between said knives comprising: means to bias said first knife horizontally away from said second knife to increase said clearance, and automatic means to shift said first knife horizontally toward said second knife in opposition to said biasing means and proportionate to the downward shift of said hold down means, wherein said automatic means comprises first and second members, said second member being adapted to be shifted by said hold down means and to shift said first member into contact with said one of said knives responsive to said shifting by said hold down means.

7. The device of claim 6, wherein said first and second members are so proportioned that the ratio of said first member to said second member equals a predetermined shearing constant.

* * * * *